(12) United States Patent
Tseng et al.

(10) Patent No.: US 11,447,041 B2
(45) Date of Patent: Sep. 20, 2022

(54) SLIDE RAIL DEVICE AND METHOD OF MANUFACTURING THE SAME

(71) Applicant: TOYO AUTOMATION CO., LTD., Tainan (TW)

(72) Inventors: Kun-Cheng Tseng, Tainan (TW); Hsiang-Wei Chen, Tainan (TW); Chung-Ju Chen, Tainan (TW)

(73) Assignee: TOYO AUTOMATION CO., LTD.

( * ) Notice: Subject to any disclaimer, the term of this patent is extended or adjusted under 35 U.S.C. 154(b) by 80 days.

(21) Appl. No.: 16/826,661

(22) Filed: Mar. 23, 2020

(65) Prior Publication Data

US 2021/0170919 A1 Jun. 10, 2021

(30) Foreign Application Priority Data

Dec. 4, 2019 (TW) .................................. 108144357

(51) Int. Cl.
*B60N 2/07* (2006.01)
*B60N 2/02* (2006.01)

(52) U.S. Cl.
CPC ......... *B60N 2/0722* (2013.01); *B60N 2/0232* (2013.01); *B60N 2002/024* (2013.01)

(58) Field of Classification Search
CPC ................ B60N 2/0722; B60N 2/0232; B60N 2002/024; F16C 29/06–0697; F16C 29/063; H02K 41/02–0358
USPC ......... 248/429; 310/12.01–12.33; 384/43–45
See application file for complete search history.

(56) References Cited

U.S. PATENT DOCUMENTS

| | | | | |
|---|---|---|---|---|
| 5,850,112 | A * | 12/1998 | Sienz ..................... | H02K 9/197 310/58 |
| 6,700,228 | B2 * | 3/2004 | Teramachi ............. | H02K 41/02 310/12.17 |
| 7,456,526 | B2 * | 11/2008 | Teramachi ............ | F16C 29/063 310/12.21 |
| 7,812,482 | B2 * | 10/2010 | Aso ...................... | H02K 41/031 165/170 |
| 10,581,309 | B2 * | 3/2020 | Da Conceição Rosa ....................... | F16F 15/03 |
| 2001/0022868 | A1 * | 9/2001 | Teramach ............. | F16C 29/063 384/45 |
| 2002/0079747 | A1 * | 6/2002 | Teramachi ............. | H02K 41/02 310/12.15 |
| 2006/0232141 | A1 * | 10/2006 | Teramachi ............ | F16C 29/063 310/12.21 |
| 2007/0009720 | A1 * | 1/2007 | Michioka .............. | F16C 29/008 428/212 |
| 2008/0303356 | A1 * | 12/2008 | Aso ...................... | H02K 41/031 310/15 |

(Continued)

*Primary Examiner* — Christopher Garft
(74) *Attorney, Agent, or Firm* — J.A. Lindeman & Co., PLLC

(57) ABSTRACT

A slide rail device includes a track member, and a slider unit that includes a slider being slidable along the track member and having a recess which is cooperatively defined by two inner side faces and an inner connecting face connected between the inner side faces, and two block boards fixedly fastened to the inner connecting face. The slide rail device further includes a linear motor unit that includes a rotor connected to the inner connecting face and cooperating with the inner connecting face, the inner side faces and the block boards to define a filling space, and a heat dissipating member that fills the filling space, and that is seamlessly connected between the rotor and the slider unit.

4 Claims, 7 Drawing Sheets

(56) References Cited

U.S. PATENT DOCUMENTS

2016/0336843 A1* 11/2016 Da Conceição
                                  Rosa .................. F16F 15/03

* cited by examiner

SLIDE RAIL DEVICE AND METHOD OF MANUFACTURING THE SAME

CROSS-REFERENCE TO RELATED APPLICATION

This application claims priority of Taiwanese Patent Application No. 108144357, filed on Dec. 4, 2019.

FIELD

The disclosure relates to a slide rail device, and more particularly to a slide rail device including a heat dissipating member, and a method of manufacturing the slide rail device.

BACKGROUND

A conventional slide rail device disclosed in Taiwanese Utility Model Patent No. M489035 includes a base seat, a slider that is movably disposed on the base seat, a plurality of ceramic roller units that facilitate movement of the slider relative to the base seat, and a linear motor that drives the movement of the slider relative to the base seat. The linear motor includes a rotor and a stator that are mounted to the slider and the base seat, respectively.

When an electromagnetic field of the rotor, which is produced by electric current, interacts with a magnetic field of the stator, a resulting magnetic force drives the slider to move relative to the base seat.

However, during operation of the abovementioned conventional slider rail device, in order to increase a moving speed or a loading capacity of the slider, stronger electromagnetic field (i.e. greater electric current) of the rotor is required, which in turn raises the temperature of the rotor. As a result, the raised temperature often compromises the effectiveness of electromagnetic induction of the motor, thereby decreasing an overall efficiency of the linear motor. Therefore, having an effective cooling system is crucial for the operation of the conventional slider rail device.

SUMMARY

Therefore, the object of the disclosure is to provide a slide rail device that can alleviate the drawback of the prior art, and a method of manufacturing the same.

According to an aspect of the disclosure, a slide rail device includes a track member, a slider unit, a linear motor unit, a heat dissipating member and two recirculating bearing units.

The track member extends along a longitudinal direction, and has two side walls, a base wall and two outer passage halves.

The side walls are opposite to each other along a transverse direction which is transverse to the longitudinal direction. The base wall interconnects the side walls. The outer passage halves are indented respectively into the side walls and extend along the longitudinal direction.

The slider unit includes a slider and two block boards.

The slider is disposed on the track member between the side walls, is slidable along the base wall, and has upper and lower faces, two end faces, two outer side faces, a recess, two first passage holes and two inner passage halves.

The upper and lower faces are parallel to each other. The end faces are opposite to each other along the longitudinal direction, and are connected between the upper and lower faces. The outer side faces are opposite to each other along the transverse direction, and are connected between the end faces.

The recess is indented into the lower face, extends through the end faces along the longitudinal direction, and is cooperatively defined by two inner side faces that are opposite to each other along the transverse direction, and that are transverse to the lower face, and an inner connecting face that is disposed between and parallel to the upper and lower faces, and that is connected between the inner side faces.

The first passage holes extend through the end faces along the longitudinal direction, and are disposed at opposite sides of the recess along the transverse direction. The inner passage halves are indented respectively into the outer side faces. Each of the inner passage halves cooperates with a respective one of the outer passage halves to form a second passage hole.

The block boards are disposed in the recess, are opposite to each other along the longitudinal direction, are fixedly fastened to the inner connecting face of the slider, and cooperate with the inner connecting face and the inner side faces to define a receiving space that opens toward the base wall of the track member.

The linear motor unit includes a stator, a rotor and a plurality of screws.

The stator is fixedly disposed on the base wall of the track member. The rotor is received in the receiving space, is connected to the inner connecting face of the slider, and has a surrounding face that cooperates with the inner connecting face, the inner side faces and the block boards to define a filling space. The screws fixedly fasten the rotor to the inner connecting face.

The heat dissipating member fills the filling space, and is seamlessly connected between the rotor and the slider unit.

Each of the recirculating bearing units includes two recirculating devices and a roller group.

The recirculating devices are opposite to each other along the longitudinal direction, and are mounted respectively to the end faces of the slider. Each of the recirculating devices has a recirculating hole. The recirculating holes of the recirculating devices of each recirculating bearing unit cooperate with a respective one of the first passage holes and a respective one of the second passage holes to define a recirculating circuit. The roller group is movably received in the recirculating circuit.

A first distance between the inner connecting face and an imaginary reference plane which is defined by center axes of the first passage holes is greater than a second distance between the imaginary reference plane and the lower face of the slider.

According to another aspect of the disclosure, a method of manufacturing the above-mentioned slide rail device includes the steps of:

(A) preparing a slider unit and a linear motor unit, the slider unit including a slider and two block boards, the slider having upper and lower faces that are parallel to each other, two end faces that are opposite to each other along a longitudinal direction and that are connected between the upper and lower faces, two outer side faces that are opposite to each other along a transverse direction transverse to the longitudinal direction and that are connected between the end faces, a recess, and two first passage holes, the recess being indented into the lower face, extending through the end faces along the longitudinal direction, and being cooperatively defined by two inner side faces and an inner connecting face, the inner side faces being opposite to each other along the transverse direction and being transverse to the lower face, the inner connecting face being disposed between and parallel to the upper and lower faces and connected between the inner side faces, the first passage holes extending through the end faces along the longitudinal direction, a first distance between the inner connecting face and an imaginary reference plane which is defined by center axes of the first passage holes being greater than a second distance between the imaginary reference plane and the bottom face of the slider, the linear motor unit including a rotor;

(B) arranging the block boards in the recess and along the longitudinal direction, and fixedly fastening the block boards to the inner connecting face of the slider by a plurality of screws such that the block boards cooperate with the inner connecting face and the inner side faces to define a receiving space;

(C) disposing the rotor in the receiving space, and fixedly fastening the rotor to the inner connecting face of the slider by a plurality of screws such that a surrounding surface of the rotor cooperates with the inner connecting face, the inner side faces and the block boards to define a filling space; and (D) filling the filling space with a heat dissipating material which is in an uncured liquid state, such that when the heat dissipating material is cured and forms a heat dissipating member, the heat dissipating member is seamlessly connected between the slider unit and the rotor.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
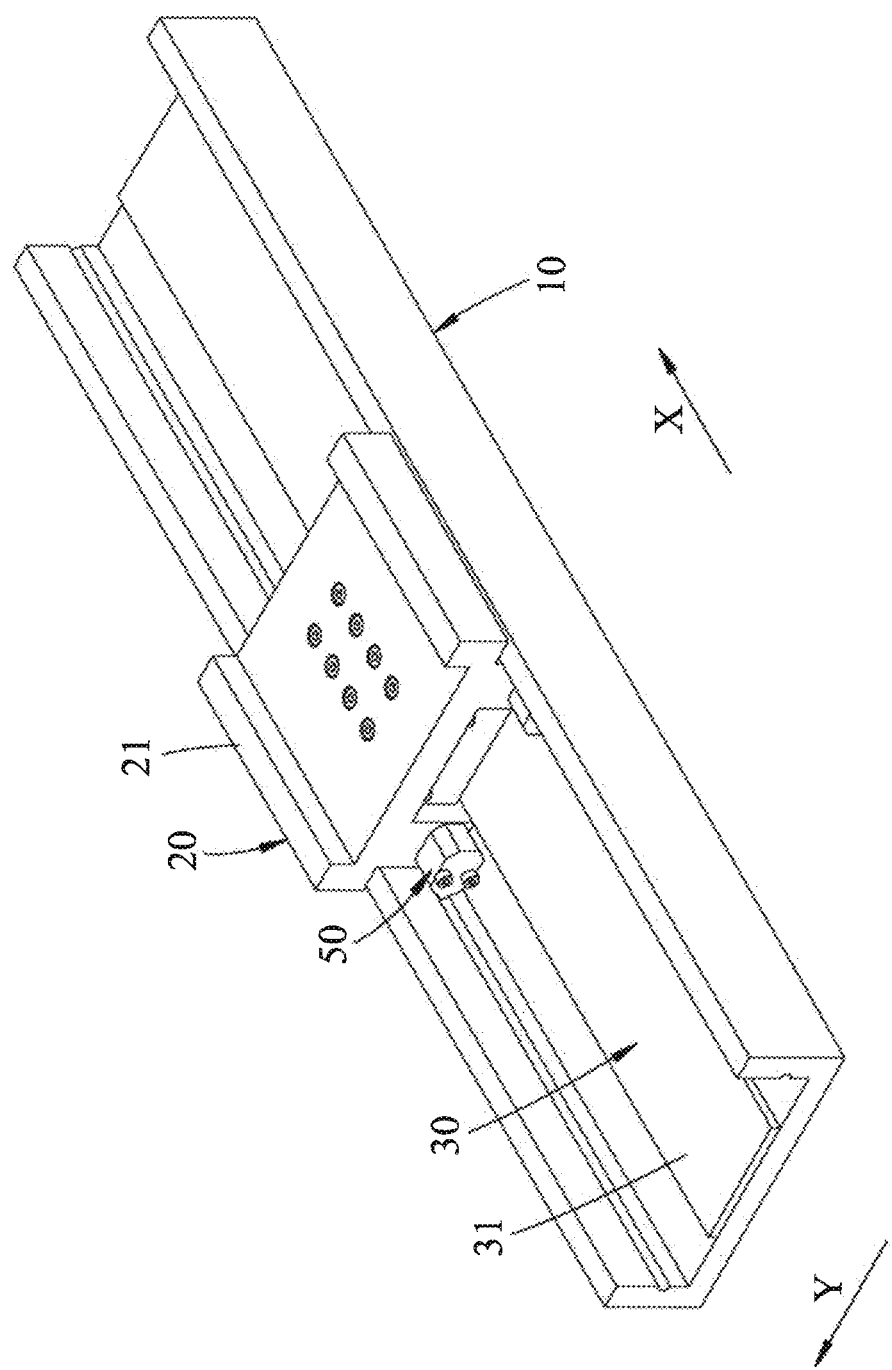
FIG. 1 is a perspective view of a first embodiment of a slide rail device according to the disclosure.

Before the present disclosure is described in greater detail, it should be noted that where considered appropriate, reference numerals or terminal portions of reference numerals have been repeated among the figures to indicate corresponding or analogous elements, which may optionally have similar characteristics.

Figure 2:
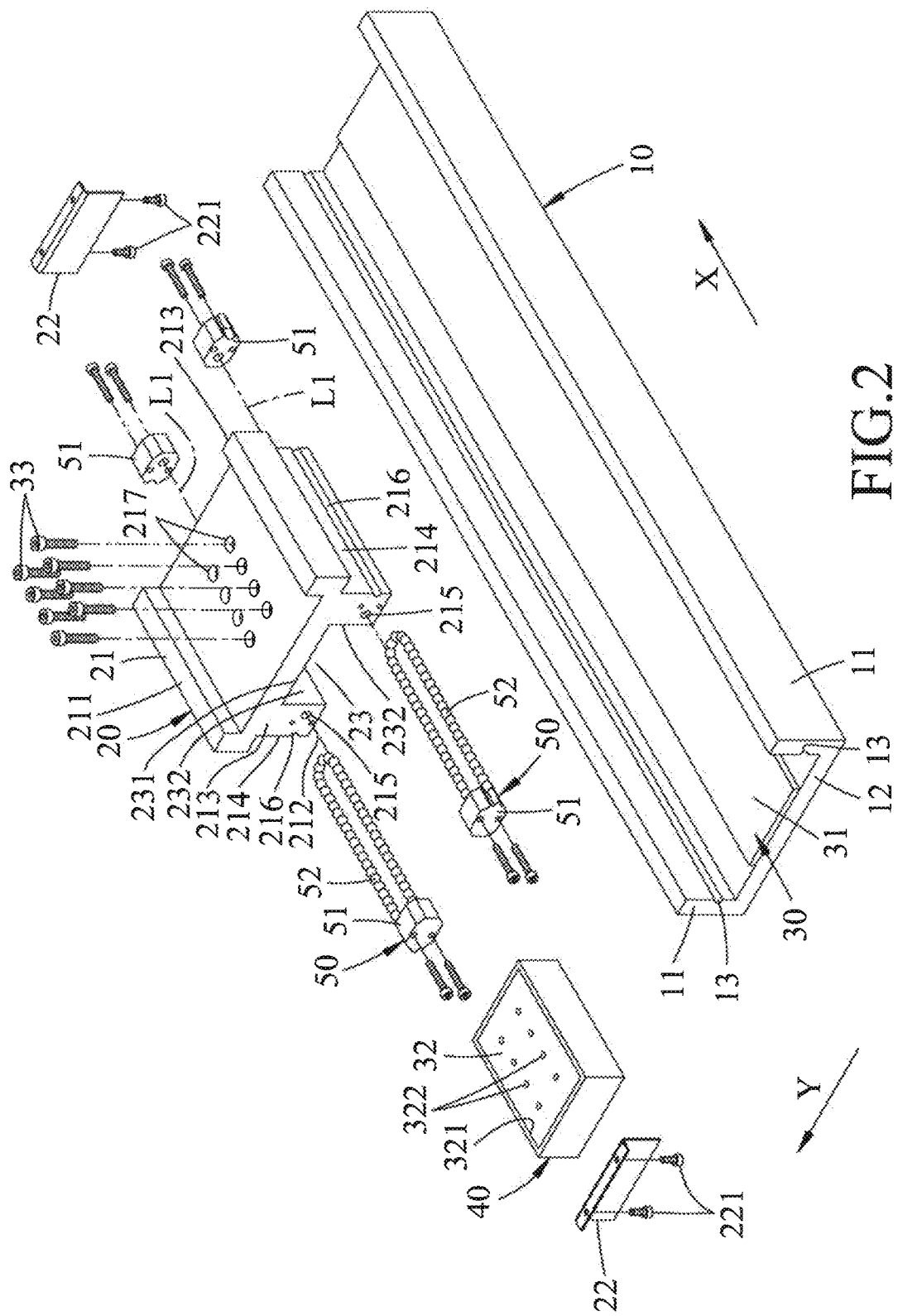
FIG. 2 is an exploded perspective view of the first embodiment.
Figure 3:
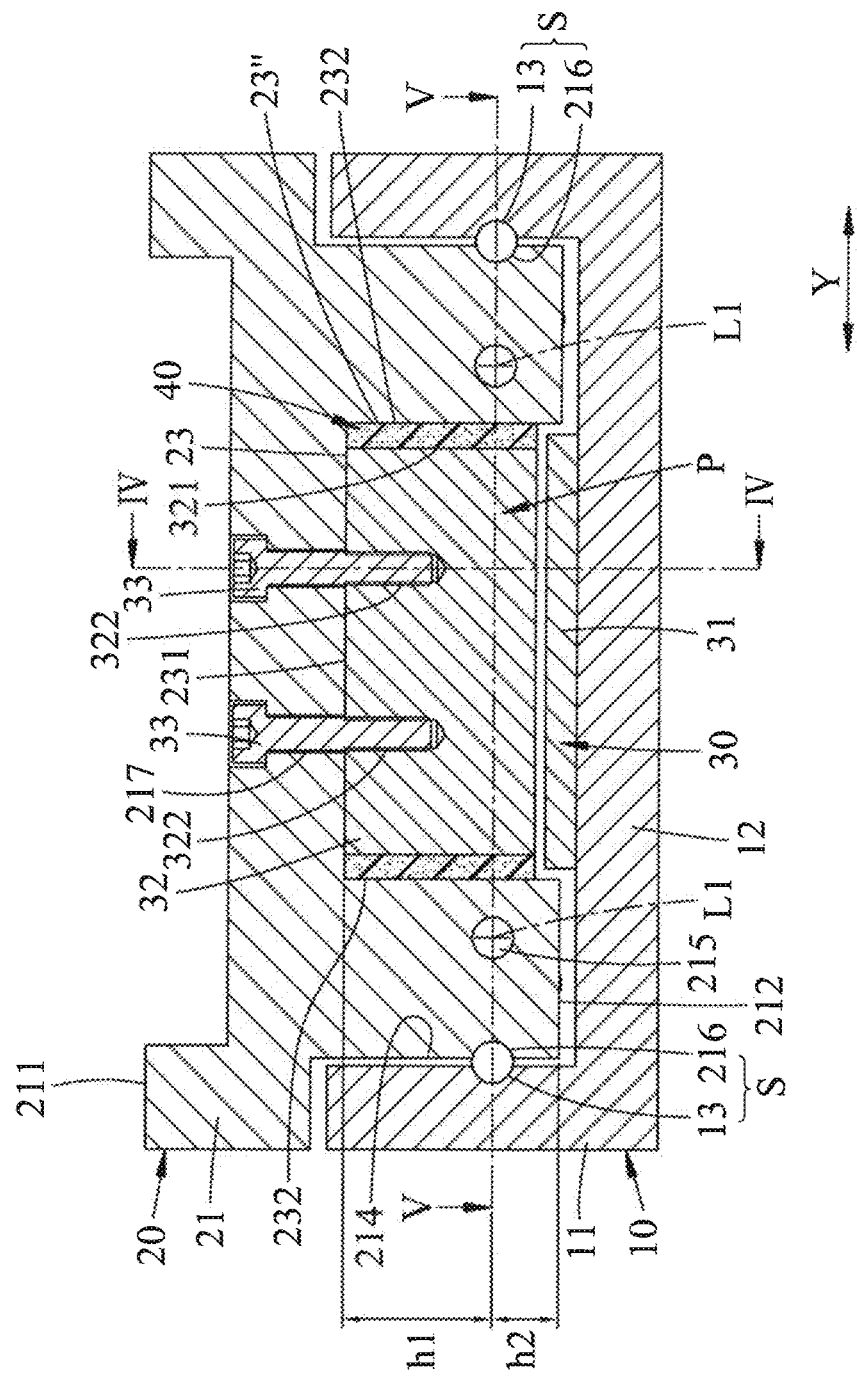
FIG. 3 is a sectional view of the first embodiment.

Referring to FIGS. 1 to 3, a first embodiment of a slide rail device includes a track member 10, a slider unit 20, a linear motor unit 30, a heat dissipating member 40 and two recirculating bearing units 50.

The track member 10 extends along a longitudinal direction (X), and has two side walls 11, a base wall 12 and two outer passage halves 13.

The side walls 11 are opposite to each other along a transverse direction (Y) which is transverse to the longitudinal direction (X), and are interconnected by the base wall 12. The outer passage halves 13 are indented respectively into the side walls 11, and extend along the longitudinal direction (X).

The slider unit 20 includes a slider 21 and two block boards 22.

The slider 21 is disposed on the track member 10 between the side walls 11, is slidable along the base wall 12, and has upper and lower faces 211, 212, two end faces 213, two outer side faces 214, a recess 23, two first passage holes 215, two inner passage halves 216 and a plurality of screw holes 217.

The upper and lower faces 211, 212 are parallel to each other. The end faces 213 are opposite to each other along the longitudinal direction (X), and are connected between the upper and lower faces 211, 212. The outer side faces 214 are opposite to each other along the transverse direction (Y), and are connected between the end faces 213.

The recess 23 is indented into the lower face 212, extends through the end faces 213 along the longitudinal direction (X), and is cooperatively defined by two inner side faces 232 and an inner connecting face 231. Specifically, the inner side faces 232 are opposite to each other along the transverse direction (Y), and are transverse to the lower face 212. The inner connecting face 231 is disposed between and parallel to the upper and lower faces 211, 212, and is connected between the inner side faces 232. In the present embodiment, each of the inner side faces 232 is a flat surface.

The first passage holes 215 extend through the end faces 213 along the longitudinal direction (X), and are disposed at opposite sides of the recess 23 along the transverse direction (Y). The inner passage halves 216 are indented respectively into the outer side faces 214. Each of the inner passage halves 216 cooperates with a respective one of the outer passage halves 13 to form a second passage hole (S) (see FIG. 3). The screw holes 217 extend through the upper face 211 and the inner connecting face 231 of the slider 21.

It should be noted that, as shown in FIG. 3, a first distance (h1) between the inner connecting face 231 and an imaginary reference plane (P) which is defined by center axes (L1) of the first passage holes 215 is greater than a second distance (h2) between the imaginary reference plane (P) and the lower face 212 of the slider 21.

Figure 4:
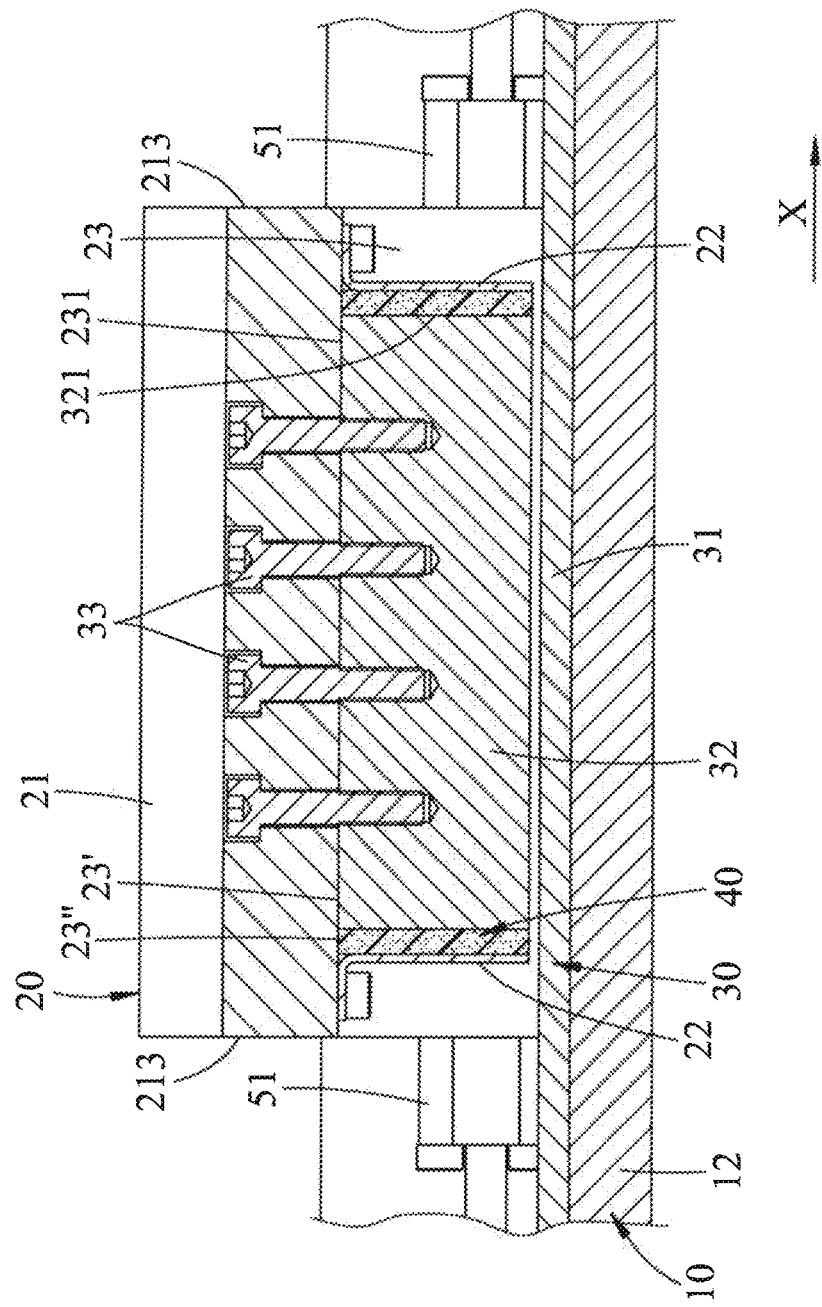
FIG. 4 is a sectional view taken along line IV-IV in FIG. 3.

Referring further to FIG. 4, the block boards 22 are disposed in the recess 23 of the slider 21, are opposite to each other along the longitudinal direction (X), are fixedly fastened to the inner connecting face 231 of the slider 21, and cooperate with the inner connecting face 231 and the inner side faces 232 to define a receiving space 23' that opens toward the base wall 12 of the track member 10.

The linear motor unit 30 includes a stator 31, a rotor 32 and a plurality of screws 33.

The stator 31 is fixedly disposed on the base wall 12 of the track member 10. The rotor 32 is received in the receiving space 23' of the slider unit 20, is connected to the inner connecting face 231 of the slider 21, and has a surrounding face 321 that cooperates with the inner connecting face 231, the inner side faces 232 and the block boards 22 to define a filling space 23" which surrounds the rotor 32. The screws 33 fixedly fasten the rotor 32 to the inner connecting face 231 of the slider 21 via the screw holes 217 of the slider 2.

The heat dissipating member 40 fills the filling space 23", and is seamlessly connected between the rotor 32 and the slider unit 20. In the present embodiment, the heat dissipating member 40 is made of a thermo-conductive epoxy resin.

Figure 5:
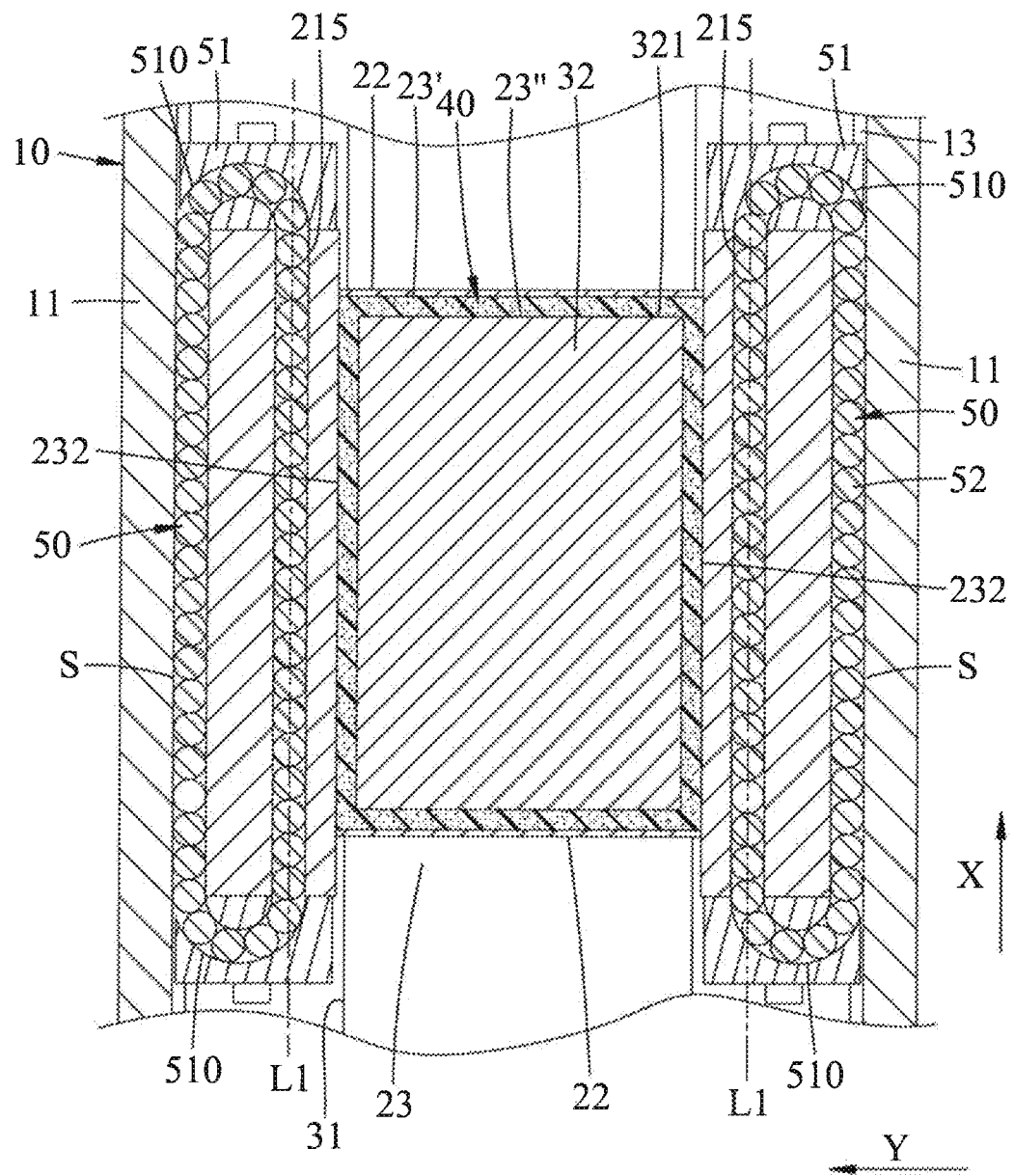
FIG. 5 is a sectional view taken along line V-V in FIG. 3.

Referring to FIG. 5 in conjunction with FIG. 2, each of the recirculating bearing units 50 includes two recirculating devices 51 and a roller group 52.

For each of the recirculating bearing units 50, the recirculating devices 51 are opposite to each other along the longitudinal direction (X), and are mounted respectively to the end faces 213 of the slider 21. Each of the recirculating devices 51 has a recirculating hole 510. The recirculating holes 510 of the recirculating devices 51 cooperate with a respective one of the first passage holes 215 and a respective one of the second passage holes (S) to define a recirculating circuit. The roller group 52 is movably received in the recirculating circuit.

Referring again to FIGS. 1 to 5, for a further understanding of the embodiment of the disclosure, a method of manufacturing the slide rail device is detailed hereinafter, which includes steps as follows.

Step 1: Prepare the slider unit 20 and the linear motor unit 30.

Step 2: Arrange the block boards 22 in the recess 23 of the slider 21 along the longitudinal direction (X), and fixedly fasten the block boards 22 to the inner connecting face 231 of the slider 21 by the screws 221 such that the block boards 22 cooperate with the inner connecting face 231 and the inner side faces 232 of the slider 21 to define the receiving space 23'.

Step 3: Dispose the rotor 32 of the linear motor unit 30 in the receiving space 23', and threadedly engage the screws 33 with the screw holes 217 of the slider 21 and the screw holes 322 of the rotor 32 such that the rotor 32 is fixedly fastened to the inner connecting face 231 of the slider 21, and such that the surrounding surface 321 of the rotor 32 cooperates with the inner connecting face 231, the inner side faces 232 and the block boards 22 to define the filling space 23".

Step 4: Fill the filling space 23" with a heat dissipating material which is in an uncured liquid state, such that when the heat dissipating material is cured and forms the heat dissipating member 40, the heat dissipating member 40 is seamlessly connected between the slider unit 20 and the rotor 32.

Step 5: Dispose the slider unit 20, the rotor 32 and the heat dissipating member 40 that are connected as a whole on the track member 10; dispose the roller groups 52 of the recirculating bearing units 50 in the first passage holes 215 and the second passage holes (S); and mount the recirculating devices 51 of the recirculating bearing units 50 to the slider unit 20 such that the roller groups 52 are confined in the recirculating circuits.

Figure 7:
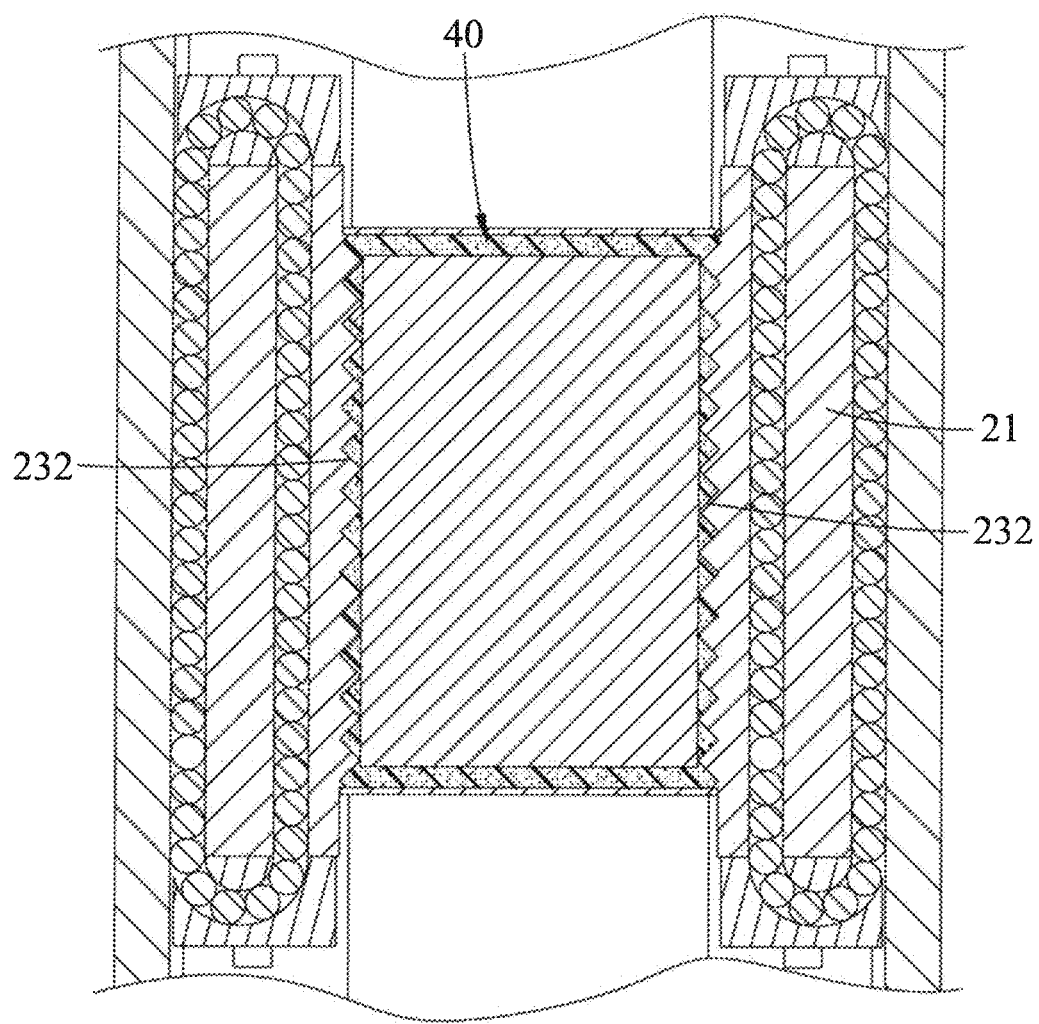
FIG. 7 is a sectional view of a second embodiment of the slide rail device according to the disclosure.

Referring to FIG. 7, a second embodiment of the slide rail device is provided. The main difference between the first and second embodiments resides in that, in the second embodiment, each of the inner side faces 232 of the slider 21 is a waved surface.

Compared with the first embodiment, areas of the inner side faces 232 in the present embodiment are greater than that in the first embodiment. Since the heat dissipating member 40 and the slider 21 are seamlessly connected, a total surface area for heat dissipation in the present embodiment is greater than that in the first embodiment, resulting in a more efficient heat dissipation.

However, in variations of the present embodiment, the inner side faces 232 of the slider 21 are not limited to the above-mentioned configuration; the inner side faces 232 may have a variety of profiles and shapes for increasing the efficiency of heat dissipation.

In sum, the slide rail device according to the disclosure has advantages as follows.

Firstly, by virtue of the heat dissipating member 40, heat generated by the rotor 32 during operation is dissipated out of the slider unit 20 through the heat dissipating member 40, so that temperature rises of the rotor 32 are mitigated during the operation. Thus, compared with the prior art, the effectiveness of electromagnetic induction of the rotor 32 and the efficiency of the linear motor unit 30 are less affected throughout the course of use.

Figure 6:
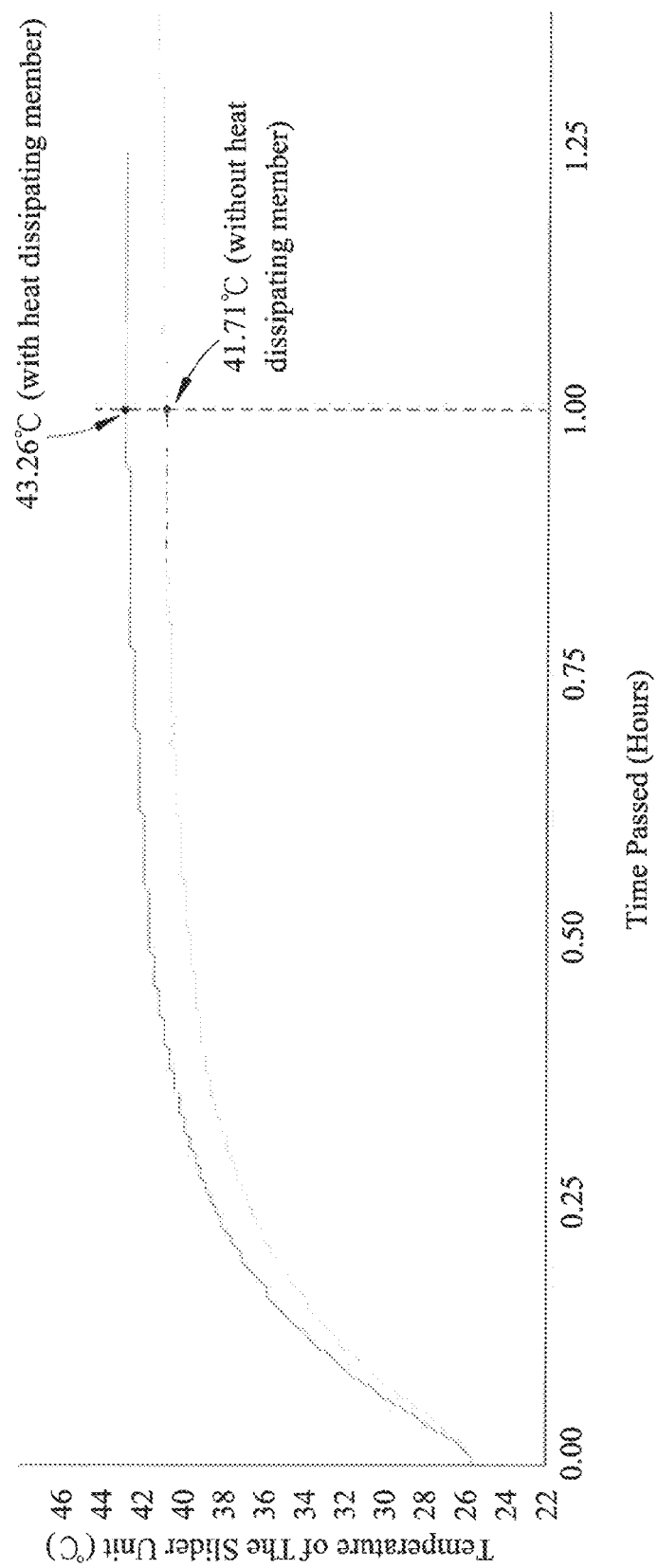
FIG. 6 is a curve chart, showing relationship between a measured temperature of a slider unit of the first embodiment and time passed since the start of an operation.

Secondly, since the heat dissipating material is poured into the filling space 23" while it is in its uncured liquid state, the heat dissipating member 40 formed therefrom is connected seamlessly between the slider unit 20 and the rotor 32, and such seamless connection helps facilitate the heat dissipation of the rotor 32. Referring to FIG. 6, a curve chart of measured temperature (° C.) of the slider unit 20 of the first embodiment over time passed (Hours) since the start of the operation is provided as an example. As shown in the chart, after one hour has passed, the temperature of the slider unit 20 of the first embodiment (i.e. with the heat dissipating member 40) plateaus around 43.26° C., while the temperature of the slider unit 20 without the heat dissipating member 40 plateaus around 41.71° C. Such results indicate that with the inclusion of the heat dissipating member 40, more heat can be transferred from the rotor 32 to the slider unit 20.

Finally, since the forming of the heat dissipating member 40 directly takes place in the filling space 23" of the slider unit 20, that is, the slider unit 20 itself serves as a mold for the heat dissipating member 40, there is no need to prepare a separate mold or additional fixture for the forming process, which is cost-efficient and time-saving.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A slide rail device comprising:
   a track member that extends along a longitudinal direction, and that has
      two side walls being opposite to each other along a transverse direction which is transverse to the longitudinal direction,
      a base wall interconnecting said side walls, and
      two outer passage halves indented respectively into said side walls and extending along the longitudinal direction;

a slider unit that includes
  a slider disposed on said track member between said side walls, being slidable along said base wall, and having
    upper and lower faces that are parallel to each other,
    two end faces that are opposite to each other along the longitudinal direction, and that are connected between said upper and lower faces,
    two outer side faces that are opposite to each other along the transverse direction, and that are connected between said end faces,
    a recess that is indented into said lower face, that extends through said end faces along the longitudinal direction, and that is cooperatively defined by
      two inner side faces being opposite to each other along the transverse direction, and being transverse to said lower face, and
      an inner connecting face disposed between and parallel to said upper and lower faces, and connected between said inner side faces,
    two first passage holes that extend through said end faces along the longitudinal direction, and that are disposed at opposite sides of said recess along the transverse direction, and
    two inner passage halves that are indented respectively into said outer side faces, each of said inner passage halves cooperating with a respective one of said outer passage halves to form a second passage hole, and
  two block boards disposed in said recess, being opposite to each other along the longitudinal direction, fixedly fastened to said inner connecting face of said slider, and seamlessly connected with said inner connecting face and said inner side faces such that said block boards cooperate with said inner connecting face and said inner side faces to define a receiving space that opens toward said base wall of said track member;
a linear motor unit that includes
  a stator fixedly disposed on said base wall of said track member,
  a rotor received in said receiving space, connected to said inner connecting face of said slider, and having a surrounding face that cooperates with said inner connecting face, said inner side faces and said block boards to define a filling space, and
  a plurality of screws fixedly fastening said rotor to said inner connecting face;
a heat dissipating member that fills said filling space, and that is seamlessly connected between said rotor and said slider unit such that said heat dissipating member is configured for facilitating heat transfer between said rotor and said slider and said block boards of said slider unit through thermal conduction; and
two recirculating bearing units, each of said recirculating bearing units including
  two recirculating devices being opposite to each other along the longitudinal direction, and being mounted respectively to said end faces of said slider, each of said recirculating devices having a recirculating hole, said recirculating holes of said recirculating devices of each recirculating bearing unit cooperating with a respective one of said first passage holes and a respective one of said second passage holes to define a recirculating circuit, and
  a roller group movably received in said recirculating circuit;
wherein a first distance between said inner connecting face and an imaginary reference plane which is defined by center axes of said first passage holes is greater than a second distance between the imaginary reference plane and said lower face of said slider so as to facilitate heat dissipation during operation of said recirculating bearing units.

2. The slide rail device as claimed in claim 1, wherein said heat dissipating member is made of a thermo-conductive epoxy resin.

3. The slide rail device as claimed in claim 1, wherein each of said inner side faces is a flat surface.

4. The slide rail device as claimed in claim 1, wherein each of said inner side faces is a waved surface.

* * * * *